US012251934B2

(12) United States Patent
Sato et al.

(10) Patent No.: US 12,251,934 B2
(45) Date of Patent: Mar. 18, 2025

(54) LIQUID EJECTION HEAD

(71) Applicant: CANON KABUSHIKI KAISHA, Tokyo (JP)

(72) Inventors: Ryo Sato, Tokyo (JP); Kyosuke Toda, Kanagawa (JP); Shimpei Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 18/073,716

(22) Filed: Dec. 2, 2022

(65) Prior Publication Data

US 2023/0173809 A1 Jun. 8, 2023

(30) Foreign Application Priority Data

Dec. 3, 2021 (JP) ................................. 2021-196824

(51) Int. Cl.
*B41J 2/14* (2006.01)
*B41J 2/055* (2006.01)

(52) U.S. Cl.
CPC ............. *B41J 2/1404* (2013.01); *B41J 2/055* (2013.01); *B41J 2/14024* (2013.01); *B41J 2/14145* (2013.01); *B41J 2/14201* (2013.01)

(58) Field of Classification Search
CPC ...... B41J 2/14024; B41J 2/055; B41J 2/1404; B41J 2/14145; B41J 2/14201
See application file for complete search history.

(56) References Cited

U.S. PATENT DOCUMENTS

| | | | | |
|---|---|---|---|---|
| 8,240,814 | B2 | 8/2012 | Saikawa et al. | |
| 8,998,375 | B2 | 4/2015 | Amma et al. | |
| 9,770,911 | B2 | 9/2017 | Inada et al. | |
| 9,950,532 | B2 * | 4/2018 | Togashi | B41J 2/1623 |
| 2021/0170748 | A1 | 6/2021 | Takagi et al. | |
| 2021/0387454 | A1 | 12/2021 | Omura et al. | |

FOREIGN PATENT DOCUMENTS

| | | | |
|---|---|---|---|
| JP | 2006-240150 | A | 9/2006 |

* cited by examiner

*Primary Examiner* — Geoffrey S Mruk
(74) *Attorney, Agent, or Firm* — Venable LLP

(57) ABSTRACT

A liquid ejection head has: a frame having a plurality of ejection ports for ejecting a liquid; a common liquid chamber; a plurality of individual liquid chambers through which the common liquid chamber communicates with each of the ejection ports; and a plurality of energy generating elements disposed in respective individual liquid chambers. A part of a wall of the frame that forms the common liquid chamber is formed of an elastic member capable of deforming elastically, so that a volume of the common liquid chamber can be modified.

12 Claims, 11 Drawing Sheets

LIQUID EJECTION HEAD

BACKGROUND OF THE INVENTION

Field of the Invention

The present invention relates to a liquid ejection head that ejects a liquid.

Description of the Related Art

Liquid ejection heads that eject a liquid such as ink are known. In a liquid ejection head, a recording element substrate having an ejection port row is mounted on a support member, and liquid chambers in the interior of the support member, and a feeding port provided for each ejection port row in the recording element substrate are connected to each other; as a result, liquid flow channels from the liquid chamber to the ejection port are formed. In recent years, the demand for high-speed recording has spurred an increase in the number of ejection ports that are arrayed in liquid ejection heads, and flow channel designs are now called for that allow supplying large liquid flow rates.

Handling of a fluid such as an ink in a liquid ejection head may result in meniscus vibration at ejection ports, caused by liquid vibration, and in decreased precision. Meniscus vibration occurs readily in a liquid ejection head in which numerous ejection ports are disposed at a high density and in which the liquid flow rate per unit time is high. The inertial forces that impel the liquid forward from the ejection ports increases in a case, for instance, where liquid ejection from a plurality of ejection ports is stopped all at once; as a result, the liquid in the ejection ports is pushed out and a state is brought about in which the meniscus at the ejection port bulges out. A liquid tank as a liquid supply source is ordinarily configured to maintain a negative pressure for the purpose of preventing dripping of liquid out of a feeding port. A force is therefore applied, to the liquid supplied from the liquid tank, so as to draw the liquid back towards the upstream side (liquid tank side). The liquid with the meniscus bulging from the ejection port, as described above, strives as a result to retreat to the opposite side.

When ejection is stopped, so-called meniscus vibration is thus induced in which the meniscus bulges forward and withdraws rearward at the ejection port. Such vibration increases with increasing liquid flow rate per unit time. When a subsequent ejection is carried out, with a meniscus bulging forward or withdrawn rearward, then the former situation gives rise to scattering of small ink droplets, while the latter situation translates into a lower ejection speed and a smaller ejection amount; and both situations result in defective ejection for instance in the form of ejection disturbances. In a case where liquid ejection is initiated from a plurality of ejection ports all at once, from an ejection stopped state, the liquid starts moving from a stopped state. As a result, the inertial forces with which the liquid is impelled ahead of the ejection port, after initial ejection of the liquid, may fail to be large enough to bring about complete refilling of the ejection port with the liquid. Defective ejection in the form of ejection disturbances or the like occurs therefore in a case where the next ejection is initiated in a state where the meniscus at the ejection port is drawn back.

Japanese Patent Application Publication No. 2006-240150 discloses a liquid ejection head that allows reducing meniscus vibration at an ejection port. A liquid chamber in the liquid ejection head disclosed in Japanese Patent Application Publication No. 2006-240150 is provided with a buffer chamber in which a gas (for instance air bubbles) is stored. The gas in the buffer chamber absorbs and dampens meniscus vibration at the ejection port.

SUMMARY OF THE INVENTION

As disclosed in Japanese Patent Application Publication No. 2006-240150, in a case where meniscus vibration at the ejection port is absorbed and dampened by the gas within the buffer chamber, prolonged liquid ejection may result in dissolution, in the liquid, of the gas within the buffer chamber, and the volume of gas within the buffer chamber may decrease. This decrease impairs the ability to absorb and dampen meniscus vibration, and gives rise to defective ejection. In the system disclosed in Japanese Patent Application Publication No. 2006-240150, moreover, the distance from a nozzle to the buffer chamber is substantial, and a concern arises in that a sufficient effect may fail to be achieved.

It is thus an object of the present invention to provide a liquid ejection head that allows for stable liquid ejection over long periods of time.

To attain the above goal, the liquid ejection head of the present invention has:

- a frame having a plurality of ejection ports for ejecting a liquid, a common liquid chamber, a plurality of individual liquid chambers through which the common liquid chamber communicates with each of ejection ports; and
- a plurality of energy generating elements disposed in respective individual liquid chambers,
- wherein a part of a wall of the frame that forms the common liquid chamber is formed of an elastic member capable of deforming elastically so that a volume of the common liquid chamber can be modified.

The present invention succeeds in providing a liquid ejection head that allows for stable liquid ejection over long periods of time.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments.

EMBODIMENTS

Outline of a Liquid Ejection Head

Figure 1:
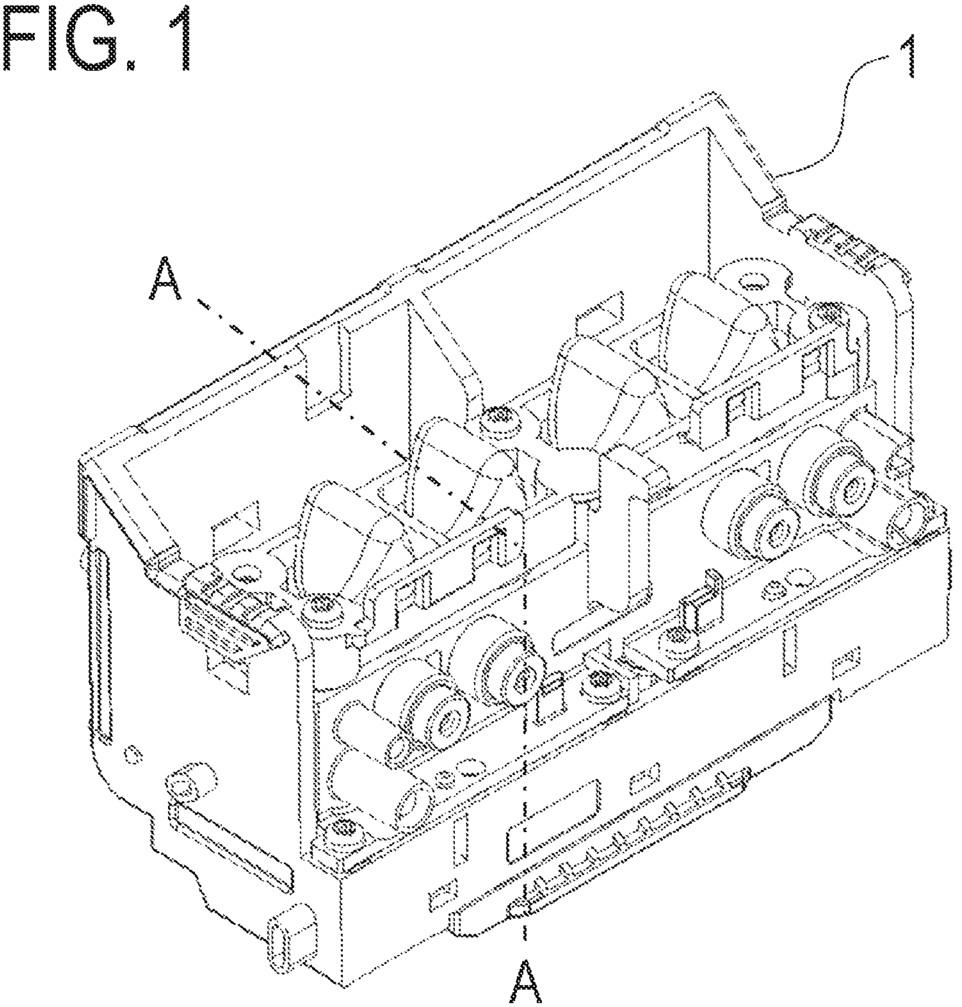
FIG. 1 is a perspective-view diagram illustrating a liquid ejection head of the embodiments.
Figure 2:
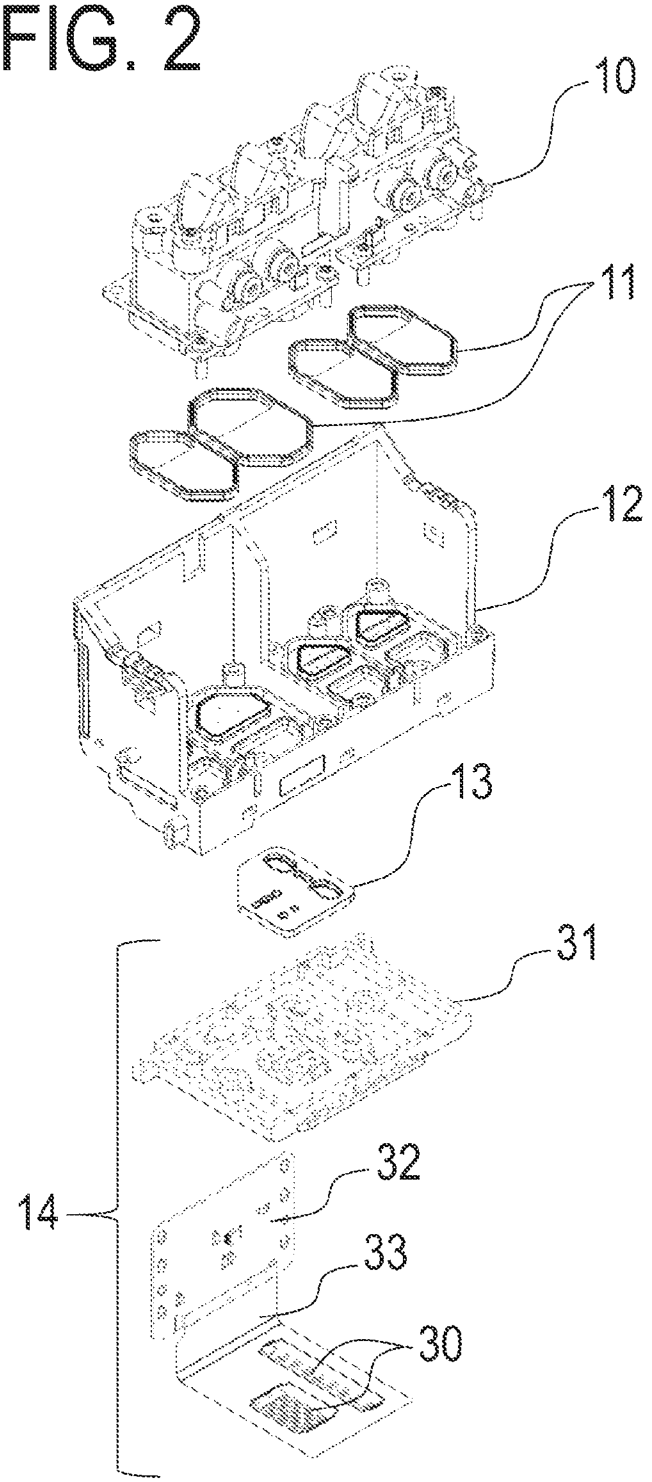
FIG. 2 is an exploded perspective-view diagram illustrating a component configuration of a liquid ejection head in the embodiments.

FIG. 1 illustrates the state after assembly of a liquid ejection head 1 for ejecting a liquid such as ink, in the embodiments of the present invention, and FIG. 2 is an exploded-view diagram of the configuration of the liquid ejection head 1 of FIG. 1 before assembly. The liquid ejection head 1 explained below is configured in the form of an inkjet recording head used for recording of a desired image on a recording material, through ejection of ink as an image recording liquid onto a recording material, for instance in an inkjet printer as an image recording device. However, the present invention can be suitably applied to uses other than inkjet recording heads.

An outline of the overall configuration of the liquid ejection head 1 will be explained first. The liquid ejection head 1 illustrated in the figure ejects a recording liquid in the form of, for instance, black ink and inks of six colors other than black. The black ink and color inks may be collectively referred to as a recording liquid.

The liquid ejection head 1 is made up of a sub-tank unit 10, first elastic members 11, a head body portion 12 and a recording element unit 14. The first elastic members 11 are sandwiched between the sub-tank unit 10 and the head body portion 12, and have the outer peripheral portion thereof sealed by screws. A second elastic member 13 is sandwiched between the head body portion 12 and the recording element unit 14, and has the outer peripheral portion thereof sealed by screws. The recording element unit 14 is made up of a support member 31, an electrical board 32, an electrical wiring board 33 and a recording element 30.

Figure 3:
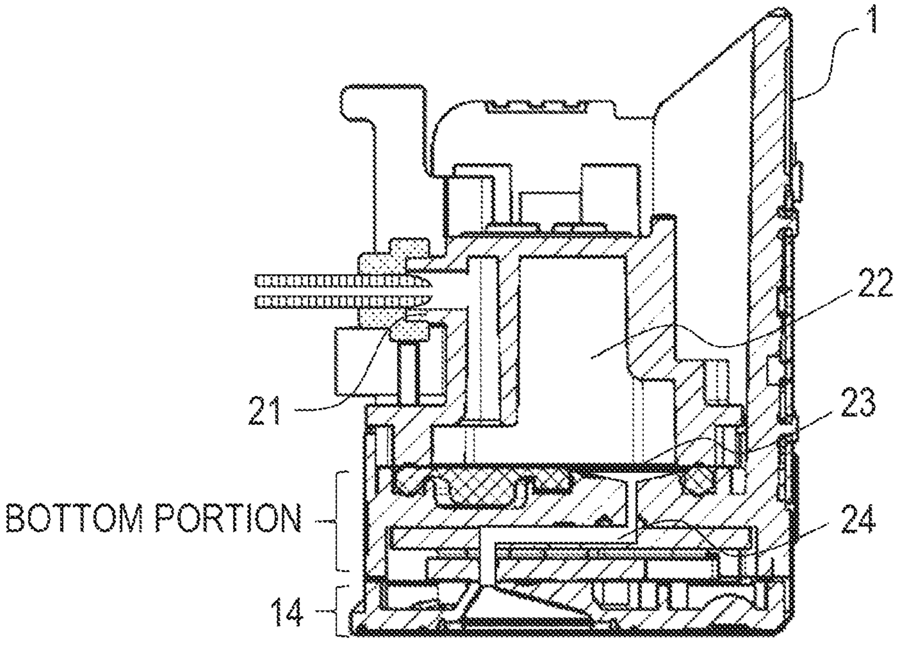
FIG. 3 is a schematic cross-sectional diagram illustrating the internal structure of a liquid ejection head in the embodiments.

FIG. 3 illustrates an A-A cross section of the liquid ejection head 1 in FIG. 1, and depicts an ink supply path in the interior of the liquid ejection head 1. Ink is supplied into of the liquid ejection head 1 via a joint portion 21 from an external ink tank (not shown) (for instance, a liquid accommodating portion provided in a printer main body). Ink supplied into the liquid ejection head 1 passes through an ink chamber 22 and a filter 23, and reaches the recording element unit 14 via an internal flow channel 24.

Figure 4:
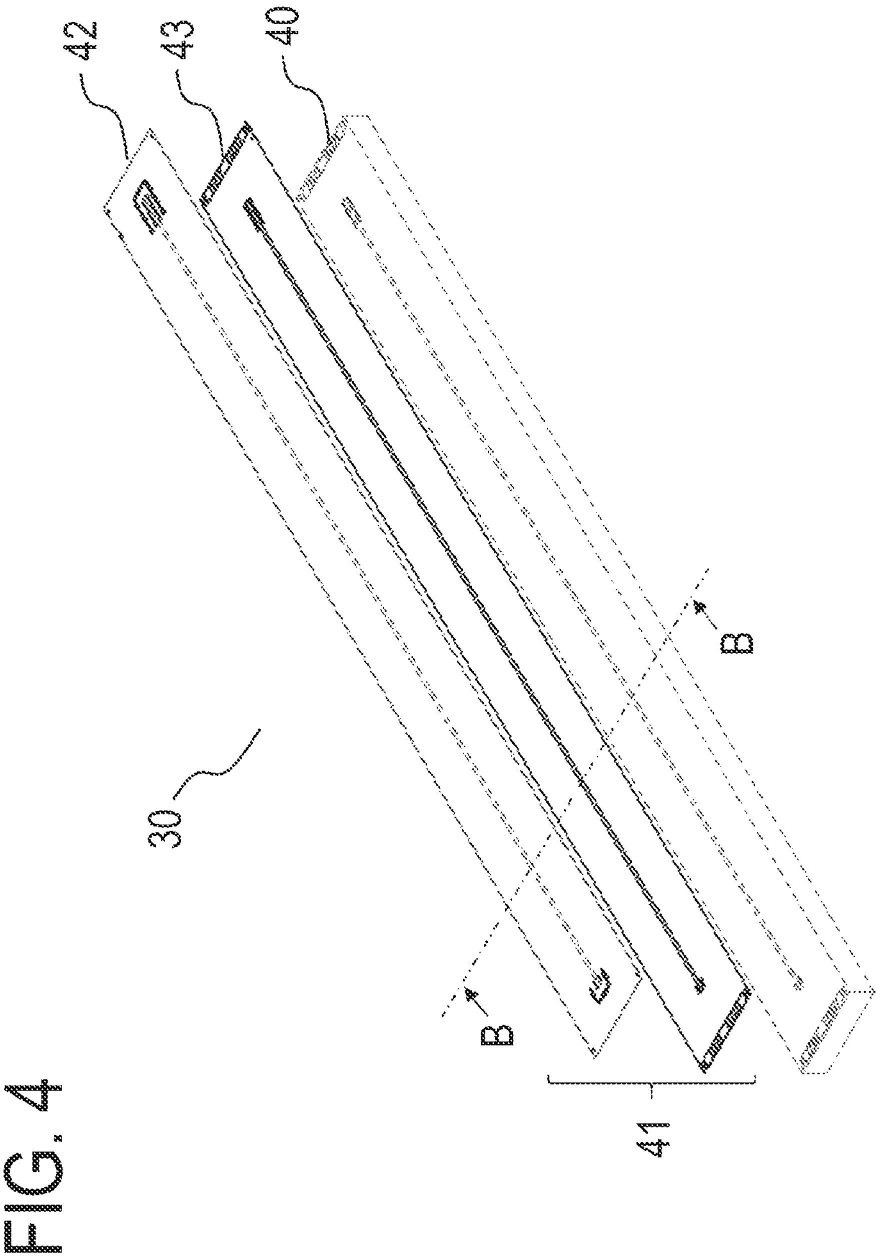
FIG. 4 is an exploded-view diagram of a recording element in the embodiments.

FIG. 4 is an exploded-view diagram illustrating the configuration of one recording element 30. The recording element 30 is formed out of a recording element substrate 40 made up of silicon (Si), and a flow channel member 41 formed on the recording element substrate 40 by photolithography. Herein the flow channel member 41 is formed out of a flow channel forming member 42, and an adhesion improving material (adhesion improving resin layer) 43 for improving adhesion between the flow channel forming member 42 and the recording element substrate 40.

An example of a production process for forming each recording element 30 will be explained next, but the example is merely illustrative in nature, and the production method of the recording element 30 of the present embodiment is not necessarily limited to the process explained herein.

Firstly, the adhesion improving material 43 is formed on the recording element substrate 40. An opening portion is formed thereafter using an exposure apparatus and a photomask. Examples of such a forming method include a method that involves using a photosensitive material as the adhesion improving material 43, and patterning the photosensitive material into an arbitrary shape using an exposure apparatus and a photomask. The adhesion improving material 43 is cured only in a portion thereof irradiated with light from the exposure apparatus, while the portion shaded by the photomask remains uncured; as a result, this allows formation of a desired shape by washing the uncured portion away after irradiation.

Depending on the material used in the adhesion improving material 43, in some instances there may be cured just the portion not irradiated with light; in the present case either approach may be adopted. It suffices herein that at least the material can be deformed elastically so as to bring out a below-described buffering function. Next, a flow channel mold material is placed on the adhesion improving material 43 formed to an arbitrary shape, and the flow channel forming member 42 is then placed thereon, to form ejection ports 52 and a through-portion 55. A flow channel portion is formed thereafter through removal of the flow channel mold material using chemicals.

First Embodiment

Figure 5:
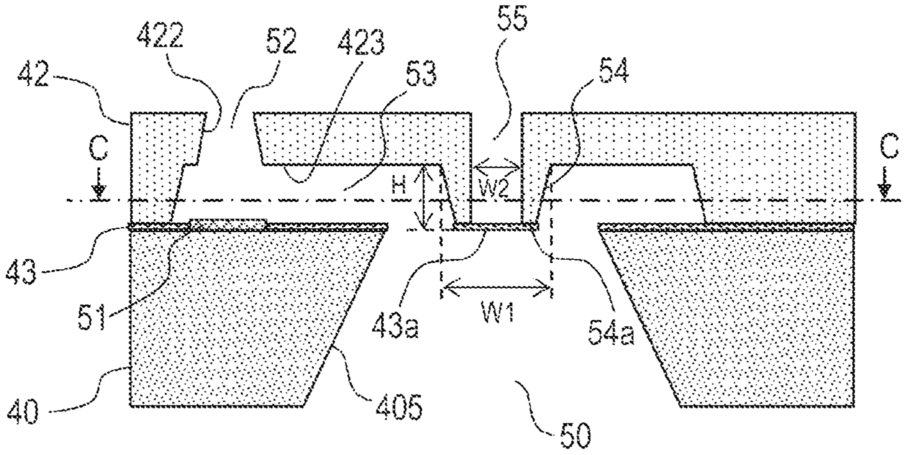
FIG. 5 is a schematic cross-sectional diagram of a recording element according to a first embodiment.
Figure 6:
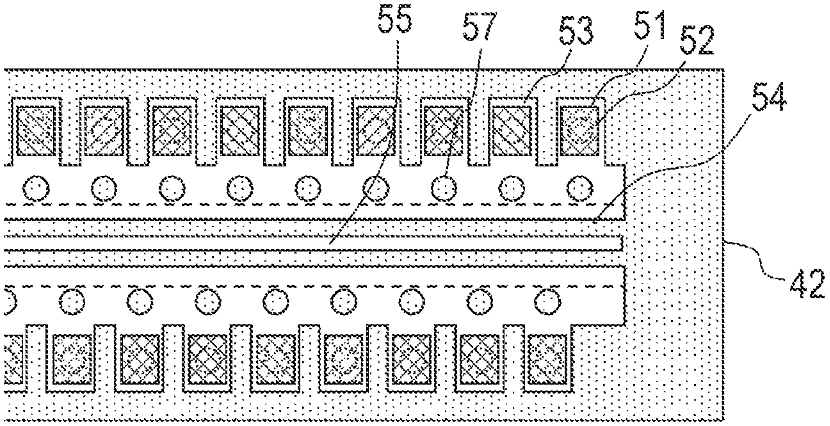
FIG. 6 is a schematic cross-sectional diagram of a recording element according to the first embodiment.

FIG. 5 illustrates a B-B cross section of FIG. 4, and FIG. 6 illustrates a C-C cross section of FIG. 5. The recording element (liquid ejection element) 30 according to the present embodiment has therein a structure provided with various liquid flow channels described below, and formed by a frame made up of the recording element substrate 40 and the flow channel member 41 (flow channel forming member 42, adhesion improving material 43).

Multiple actuators 51 as a plurality of energy generating elements are mounted on the recording element substrate 40. In the recording element substrate 40, a through-portion (substrate through-portion) 405 that makes up a part of a wall surface which forms a common liquid chamber 50 is provided penetrating the recording element substrate 40, so as to open at the mounting surface of the actuators 51. In the present embodiment, the actuators 51 are electric heat exchange elements, but may be a pressure generating unit, such as piezoelectric elements. The flow channel forming member 42 has a plurality of ejection ports 52 at positions corresponding to respective actuators 51, and further has individual liquid chambers 53 corresponding to the ejection ports 52. Specifically, the flow channel forming member 42 has recessed portions 423 on the surface opposing the recording element substrate 40. The recessed portions 423 individually cover the actuators 51, and are provided so as to partially face the substrate through-portion 405 of the recording element substrate 40, so that a plurality of individual liquid chambers 53 are formed between the recessed portions 423 and the actuator mounting surface of the recording element substrate 40. Multiple through-holes 422 are provided in the recessed portions 423 at positions opposing respective actuators 51; these through-holes 422 form the ejection ports 52.

The reference numeral 57 in FIG. 6 denotes strut-liked structural portions, formed between the common liquid chamber 50 and the individual liquid chambers 53, and which are a filter for suppressing the flow of foreign matter within the flow channel.

In the present embodiment, the actuators 51 are disposed in a staggered pattern, to a density of 600 dpi on one side and 1200 dpi on both sides. Ink is supplied from the common liquid chamber 50 to the individual liquid chambers 53 and, through driving by the actuators 51, is thereafter ejected out from the ejection ports 52.

In the present embodiment, there are formed two parallel rows (first ejection port row and second ejection port row) of ejection ports 52 disposed at equal intervals in the longitudinal direction of the recording element substrate 40. The individual liquid chambers 53 include a first individual liquid chamber row corresponding to the first ejection port row and a second individual liquid chamber row corresponding to the second ejection port row; the flow channel forming member 42 has a rib 54 as a wall portion that partitions the first individual liquid chamber row and the second individual liquid chamber row in the common liquid chamber 50. The rib 54, which is provided at a position opposing the common liquid chamber 50, makes up part of the wall surface that forms the common liquid chamber 50 together with the substrate through-portion 405.

The rib 54 is a protruding portion formed so as to protrude towards the substrate through-portion 405, from the recessed portions 423. The common liquid chamber 50 is formed extending in the longitudinal direction of the recording element substrate 40 parallel to an array direction of the actuators 51, and also the rib 54 is shaped to extend in the longitudinal direction, conforming with the common liquid chamber 50. In the present embodiment, the rib 54 extends from one end portion to the other end portion of the flow channel forming member 42 in the longitudinal direction, and has a width W1 of 60 μm and a depth H of 16 μm.

The rib 54 further has the through-portion 55 as a protruding portion through-portion. The through-portion 55 is open at the tip of the rib 54, and is provided extending in the longitudinal direction of the rib 54 in the present embodiment. In the present embodiment, a width W2 of the through-portion 55 is 45 μm. A portion 43*a* of the adhesion improving material 43 as an elastic member is adhered to the leading end surface of the rib 54 opposing the common liquid chamber 50, so as to plug the opening portion of the through-portion 55.

The portion 43*a* of the adhesion improving material 43 is a part of the adhesion improving material 43 exposed to the space (common liquid chamber 50) of the substrate through-portion 405, through formation of the substrate through-portion 405 in the production process of the recording element 30. However, the method for forming the portion 43*a* of the adhesion improving material 43 is not limited thereto, and the portion 43*a* may be provided later on by bonding.

The adhesion improving material 43 has a thickness of 2 μm and is elastic; the adhesion improving material 43 can thus be deformed in a case where the pressure in the common liquid chamber 50 changes relative to atmospheric pressure. Specifically, the adhesion improving material 43 is configured to be elastically deformable so that the volume of the common liquid chamber 50 can be modified. Even if pressure within the common liquid chamber 50 decreases transiently with respect to atmospheric pressure upon instantaneous ejection of ink from the ejection ports 52, the adhesion improving material 43 deforms and functions as a result as a buffer, so that impairment of printing quality can be prevented. In the present embodiment, a configuration having a buffering function for offsetting such a transient drop in ink supply capability at the start of ejection is provided in the form of the rib 54, which is a branch point at which ink supplied from the common liquid chamber 50 is supplied to the individual liquid chambers 53. The individual liquid chambers 53 are equally imparted as a result with a buffering function. A greater buffering effect than in a conventional configuration can also be expected herein by virtue of the fact that the buffering function is provided closer to the individual liquid chambers 53. A sustained buffering effect that does not vary over time can moreover be achieved, since in this configuration there are no bubbles within the flow channels.

That is, the present embodiment allows for stable liquid ejection overlong periods of time. The present embodiment allows preventing the occurrence of defective ejection derived from momentary supply shortfalls also in systems with a large number of nozzles and large flow rates. Moreover, bubbles accumulating in buffer portions are not washed away by flow of ink, while no defective printing occurs that is derived from bubbles flowing into the nozzles and remaining there.

Second Embodiment

A second embodiment of the present invention will be explained with reference to FIG. 7. In the second embodiment, configurations identical to those of the first embodiment will be denoted by the same reference numerals as those in the first embodiment, and a detailed explanation thereof will be omitted. Features of second embodiment not particularly explained herein are identical to those in the first embodiment.

Figure 7:
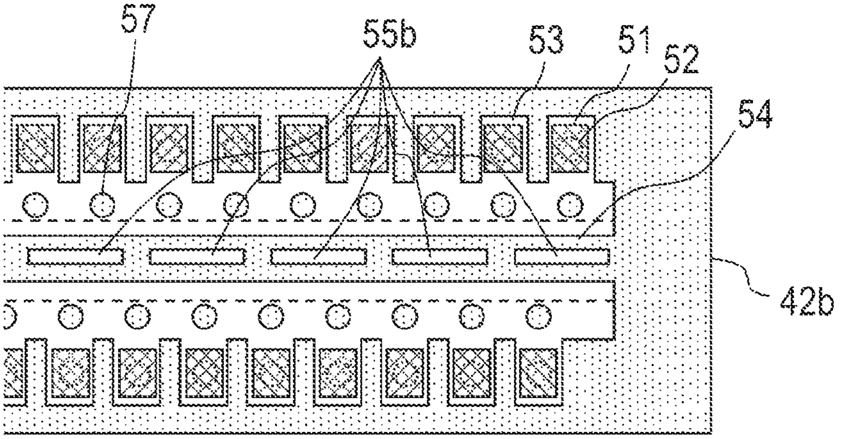
FIG. 7 is a schematic diagram of a recording element according to a second embodiment.

FIG. 7 is a schematic cross-sectional diagram of a recording element according to the second embodiment. Herein (opening portions of) through-portions 55*b* in the second embodiment are intermittently provided from one end to the other end in the longitudinal direction in which the rib 54 extends. That is, the through-portion has a split configuration along the longitudinal direction. This configuration can be expected to result in higher durability, by virtue of the fact that the joint surface between the rib 54 and the adhesion improving material 43 is larger herein.

Third Embodiment

A third embodiment of the present invention will be explained with reference to FIG. 8 and FIG. 9. In the third embodiment, configurations identical to those of the above embodiments will be denoted by the same reference numerals as those in the above embodiments, and a detailed explanation thereof will be omitted. Features of the third embodiment not particularly explained herein are identical to those in the above embodiments.

Figure 8:
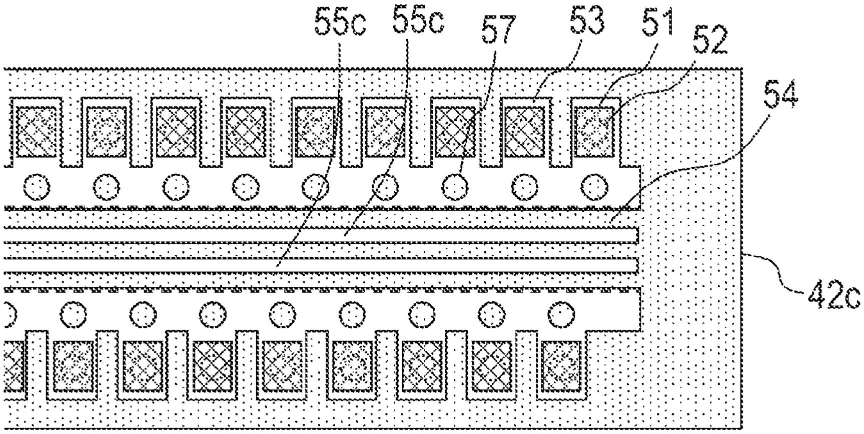
FIG. 8 is a schematic diagram of a recording element according to a third embodiment.
Figure 9:
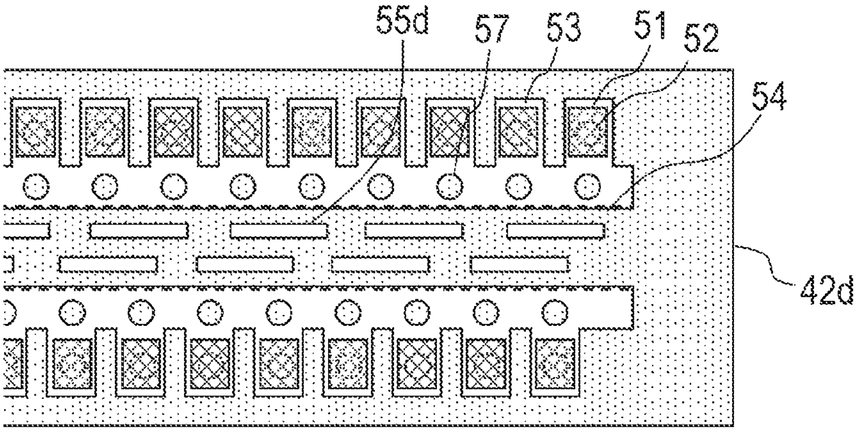
FIG. 9 is a schematic diagram of another example of a recording element according to the third embodiment.

FIG. 8 is a schematic cross-sectional diagram of a recording element according to the third embodiment, and FIG. 9 is a schematic cross-sectional diagram of another example of the recording element according to the third embodiment. In the present embodiment, multiple (opening portions of) through-portions are provided so as to be juxtaposed parallelly to each other, at intervals, in a direction perpendicular to the longitudinal direction. More specifically, the rib 54 is designed to be thicker, and two rows of through-portions 55*c* are provided in the longitudinal direction of the rib 54. In this implementation, the surface area of the adhesion improving material 43 having a buffering function becomes larger, which can be expected to result in an enhanced buffering function. Also, the distance between the individual liquid chambers 53 and the adhesion improving material 43 that elicits a buffering effect is further shortened, thanks to which the buffering effect can be made yet more pronounced. The number of rows of the through-portions may be three or more.

As in the through-portions 55*d* illustrated in FIG. 9, the two rows of (opening portions of) through-portions may be provided divided intermittently in the longitudinal direction of the rib 54. This configuration affords a larger contact surface between the rib 54 and the adhesion improving material 43, which in turn allows greater durability to be brought out. As illustrated in FIG. 9, moreover, two rows of (opening portions of) the through-portions 55 may be disposed in a staggered layout, i.e. (opening portions of) through-portions 55 that are adjacent to each other in a direction perpendicular to the longitudinal direction may be disposed so that the respective positions thereof are shifted from each other.

Fourth Embodiment

A fourth embodiment of the present invention will be explained with reference to FIGS. 10A and 10B. In the fourth embodiment, configurations identical to those of the above embodiments will be denoted by the same reference numerals as those in the above embodiments, and a detailed explanation thereof will be omitted. Features of the fourth embodiment not particularly explained herein are identical to those in the above embodiments.

Figure 10A:
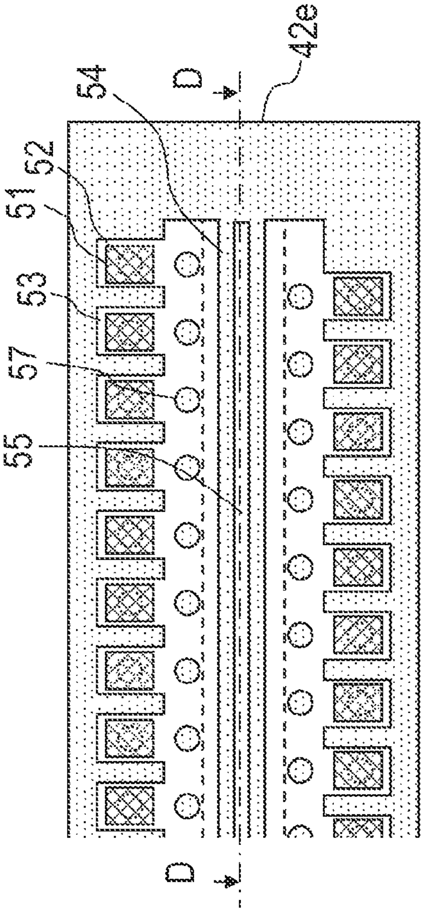
FIGS. 10A and 10B are schematic cross-sectional diagrams of a recording element according to a fourth embodiment.
Figure 10B:
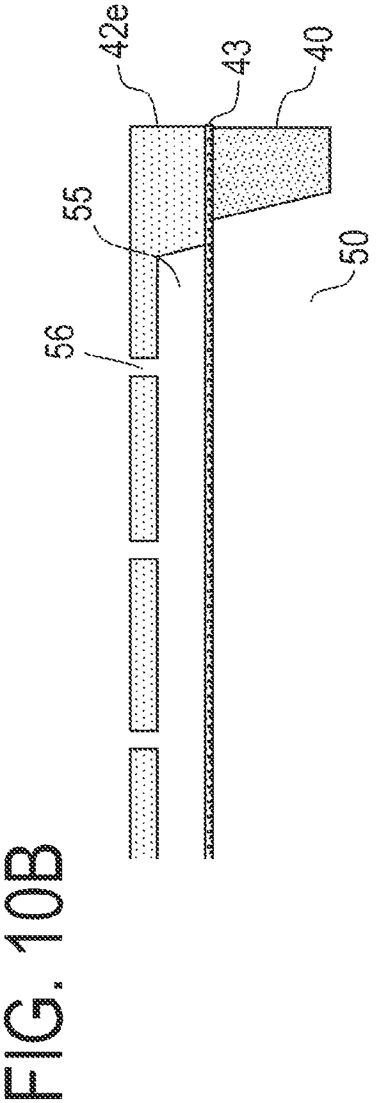

FIGS. 10A and 10B are schematic cross-sectional diagrams of a recording element according to the fourth embodiment, where FIG. 10A is a cross-sectional diagram corresponding to the C-C cross section of FIG. 5, and FIG. 10B is a D-D cross-sectional diagram of FIG. 10A. In the present embodiment, a communication port 56 that communicates with the atmosphere is provided in only part of the through-portion 55 that is provided in the rib 54. The communication port 56 is open to the top face of a flow channel forming member 42*e* (to the surface on the reverse side from that laminated on the recording element substrate 40), and partially releases the through-portion 55 to the atmosphere. A plurality of communication ports 56 may be provided herein.

The communication ports 56 are formed in accordance with the same method of formation of the ejection ports 52. By forming a plurality of communication ports 56 it becomes possible to prevent a residual mold material from remaining at the time of formation of the through-portion 55. This configuration allows preventing clogging of the through-portion 55 with foreign matter and impairment of the buffering function. The above configuration allows also preventing impairment of the buffering function, derived from damage to the adhesion improving material 43 caused by wiping or the like.

Fifth Embodiment

A fifth embodiment of the present invention will be explained with reference to FIG. 11. In the fifth embodiment, configurations identical to those of the above embodiments will be denoted by the same reference numerals as those in the above embodiments, and a detailed explanation thereof will be omitted. Features of the fifth embodiment not particularly explained herein are identical to those in the above embodiments.

Figure 11:
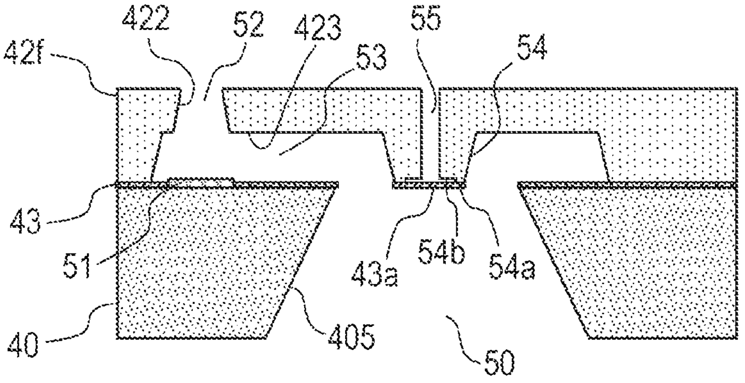
FIG. 11 is a schematic cross-sectional diagram of a recording element according to a fifth embodiment.

FIG. 11 is a schematic cross-sectional diagram of a recording element according to the fifth embodiment. In the present embodiment, a stepped portion is provided in the opening portion of the through-portion 55 that is in turn provided at the tip of the rib 54. More specifically, the tip of the rib 54 has a joint surface 54*a* to which the adhesion improving material 43 is bonded, and a recessed surface 54*b* that is recessed in a direction bearing away from the substrate through-portion 405 with respect to the joint surface 54*a*, the through-portion 55 being provided so as to be open at the recessed surface 54*b*. This implementation allows suppressing, thanks to the stepped portion, deformation of the adhesion improving material 43 towards the through-portion 55. By contrast, deformation towards the common liquid chamber 50 is not suppressed herein.

In the present embodiment, there is suppressed deformation of the adhesion improving material 43 also upon filling of the liquid ejection head with ink, or in a case where a recovery operation of sucking ink is performed for the purpose of improving on defective printing. As a result, forces exerted on the adhesion surface between the rib 54 and the adhesion improving material 43 can be suppressed, which allows improving durability as a buffering function. The number of the above stepped portions may be two or more.

The features of the above embodiments can be combined with each other so long as no technical conflicts arise in doing so.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-196824, filed on Dec. 3, 2021, which is hereby incorporated by reference herein in its entirety.

What is claimed is:

1. A liquid ejection head, comprising:

a frame having a plurality of ejection ports for ejecting a liquid, a common liquid chamber, a plurality of individual liquid chambers through which the common liquid chamber communicates with each of the ejection ports; and a plurality of energy generating elements disposed in respective individual liquid chambers, wherein a part of a wall of the frame that forms the common liquid chamber is formed of an elastic member capable of deforming elastically so that a volume of the common liquid chamber can be modified, wherein the frame includes:

a substrate on which the plurality of energy generating elements is mounted; and a flow channel forming member that is laminated on a mounting surface of the energy generating elements on the substrate, and that forms a flow channel of a liquid including the individual liquid chambers and the common liquid chamber between the flow channel forming member and the substrate, wherein the substrate has a substrate through-portion, the substrate through-portion is configured to penetrate the substrate so as to open at the mounting surface, and make up a part of a wall surface that forms the common liquid chamber, wherein the flow channel forming member has:

a recessed portion provided on an opposing surface that faces the substrate, the recessed portion being provided so as to cover individually the plurality of energy generating elements and partially oppose the substrate through-portion, such that the plurality of individual liquid chambers are formed between the mounting surface and the recessed portion, a plurality of through-holes that are opened at positions opposing respective energy generating elements in the recessed portion, and that form the plurality of ejection ports, and a wall portion that is provided at a position opposing the substrate through-portion, and that makes up a part of the wall surface that forms the common liquid chamber together with the substrate through-portion, and wherein the part of the wall portion is formed by the elastic member.

2. The liquid ejection head according to claim 1, wherein the wall portion includes:

a protruding portion formed so as to protrude towards the substrate through-portion, from the recessed portion, in the flow channel forming member; and a protruding portion through-portion that penetrates the flow channel forming member, so as to open at a tip of the protruding portion, and wherein the elastic member is provided so as to plug an opening portion of the protruding portion through-portion at the tip of the protruding portion.

3. The liquid ejection head according to claim 2, wherein the common liquid chamber extends in a longitudinal direction parallel to an array direction of the plurality of energy generating elements, and wherein the protruding portion is provided so as to extend along the longitudinal direction of the common liquid chamber.

4. The liquid ejection head according to claim 2, wherein the opening portion of the protruding portion through-portion at the tip of the protruding portion extends along a longitudinal direction parallel to an array direction of the plurality of energy generating elements.

5. The liquid ejection head according to claim 2, wherein the opening portion of the protruding portion through-portion at the tip of the protruding portion is divided into a plurality of opening portions along a longitudinal direction parallel to an array direction of the plurality of energy generating elements.

6. The liquid ejection head according to claim 2, wherein the opening portion of the protruding portion through-portion at the tip of the protruding portion extends along a longitudinal direction parallel to the array direction of the plurality of energy generating elements, and the opening portion is provided as a plurality of opening portions being juxtaposed parallelly to each other, at intervals, in a direction perpendicular to the longitudinal direction.

7. The liquid ejection head according to claim 2, wherein the opening portion of the protruding portion through-portion at the tip of the protruding portion is divided into a plurality of opening portions along a longitudinal direction parallel to an array direction of the plurality of energy generating elements, such that the plurality of opening portions form a line-up row in the longitudinal direction, wherein the row is formed as a plurality of rows juxtaposed parallelly to each other, at intervals, in a direction perpendicular to the longitudinal direction, and wherein the opening portions mutually adjacent in the direction perpendicular to the longitudinal direction are disposed so that the positions thereof in the longitudinal direction are shifted from each other.

8. The liquid ejection head according to claim 2, wherein the protruding portion through-portion has a communication port, through which the protruding portion through-portion communicates with the atmosphere at a reverse-side surface, which is opposite the opposing surface, of the flow channel forming member, and wherein the communication port opens so as to partially release the protruding portion through-portion to the exterior, from the reverse-side surface.

9. The liquid ejection head according to claim 8, wherein the protruding portion through-portion has a plurality of the communication ports.

10. The liquid ejection head according to claim 2, wherein the tip of the protruding portion has a joint surface to which the elastic member is joined, and a recessed surface that is recessed in a direction away from the substrate through-portion with respect to the joint surface, and wherein the opening portion of the protruding portion through-portion at the tip of the protruding portion is provided in the recessed surface.

11. The liquid ejection head according to claim 1, wherein the plurality of ejection ports include a first ejection port row and a second ejection port row parallel to the first ejection port row, wherein the plurality of individual liquid chambers includes a first individual liquid chambers row corresponding to the first ejection port row and a second individual liquid chambers row corresponding to the second ejection port row, wherein the wall portion is provided so as to partition the common liquid chamber into the first individual liquid chambers row and the second individual liquid chambers row in the common liquid chamber.

12. The liquid ejection head according to claim 1, wherein the frame has an adhesion improving material laid between the substrate and the flow channel forming member, and wherein the elastic member is a part of the adhesion improving material.

* * * * *